United States Patent
Geddadi et al.

(10) Patent No.: US 12,068,630 B2
(45) Date of Patent: Aug. 20, 2024

(54) CHARGER DEVICE AND A METHOD OF CHARGING USING SAID CHARGER DEVICE

(71) Applicant: TVS MOTOR COMPANY LIMITED, Chennai (IN)

(72) Inventors: Krishnamohan Geddadi, Chennai (IN); Samraj Jabez Dhinagar, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 566 days.

(21) Appl. No.: 17/282,092

(22) PCT Filed: Sep. 30, 2019

(86) PCT No.: PCT/IN2019/050723
§ 371 (c)(1),
(2) Date: Apr. 1, 2021

(87) PCT Pub. No.: WO2020/070755
PCT Pub. Date: Apr. 9, 2020

(65) Prior Publication Data
US 2021/0376647 A1 Dec. 2, 2021

(30) Foreign Application Priority Data
Oct. 1, 2018 (IN) .............................. 201841037030

(51) Int. Cl.
*H02J 7/00* (2006.01)
*B60L 53/00* (2019.01)

(52) U.S. Cl.
CPC ........ *H02J 7/007182* (2020.01); *B60L 53/00* (2019.02); *H02J 7/0049* (2020.01); *H02J 7/00714* (2020.01); *H02J 7/0013* (2013.01)

(58) Field of Classification Search
CPC .. H02J 7/007182; H02J 7/00714; B60L 53/00
USPC .................................................. 320/148, 157
See application file for complete search history.

(56) References Cited

U.S. PATENT DOCUMENTS

| | | |
|---|---|---|
| 5,637,981 A | 6/1997 | Nagai et al. |
| 5,994,875 A | 11/1999 | Lee |
| 2015/0137752 A1* | 5/2015 | Shinzaki ............... H02J 7/0048 320/132 |
| 2018/0351381 A1* | 12/2018 | Shin ...................... H02J 7/0069 |
| 2019/0275893 A1* | 9/2019 | Sham ..................... B60L 58/12 |

(Continued)

OTHER PUBLICATIONS

International Search Report issued in International Application No. PCT/IN2019/050723, mailed on Mar. 5, 2020 (3 pages).

(Continued)

*Primary Examiner* — Eric D Lee
(74) *Attorney, Agent, or Firm* — Osha Bergman Watanabe & Burton LLP

(57) ABSTRACT

A charger device for charging one or more batteries of a vehicle operates in two different user selectable modes. One of the modes operates within a user selected time interval. The two different user selectable modes are a power mode and an economy mode. Both modes are operative until a battery threshold voltage is reached. Subsequently, the charger device performs constant voltage charging until a charging current attained is less than a set threshold current value.

13 Claims, 6 Drawing Sheets

(56) References Cited

U.S. PATENT DOCUMENTS

| | | | |
|---|---|---|---|
| 2019/0386351 A1* | 12/2019 | Kim | H01M 10/4257 |
| 2020/0254887 A1* | 8/2020 | Robert | H01M 16/00 |
| 2021/0399568 A1* | 12/2021 | Huang | H02J 7/0047 |
| 2023/0105569 A1* | 4/2023 | Kostrzewski | B60L 53/305 |
| | | | 320/109 |
| 2023/0147695 A1* | 5/2023 | Earl | B60L 53/14 |
| | | | 320/109 |

OTHER PUBLICATIONS

Written Opinion issued in International Application No. PCT/IN2019/050723, mailed on Mar. 5, 2020 (6 pages).

\* cited by examiner

CHARGER DEVICE AND A METHOD OF CHARGING USING SAID CHARGER DEVICE

TECHNICAL FIELD

The present subject matter described herein generally relates to a method and apparatus for battery charging, and especially relates to chargers used for charging battery of electric vehicles.

BACKGROUND

One or more batteries is typically used in vehicles including hybrid and electric vehicles for powering said vehicles and for powering various devices being used in said vehicles. Typically, such vehicles are provided with at least one battery which is capable of being recharged. A charger device is used for charging said at least one battery. Conventional chargers used for charging said at least one battery operate in a CC-CV (constant current-constant voltage) mode. In other words, said chargers provide constant current output for charging said battery up to 80-90% of its capacity, whereas said chargers provide constant voltage output for charging said battery for its remaining capacity, thereby charging said battery to 100%. Conventional chargers operate to perform 100% charging as described above without typically considering the AC line voltage variations. However, charging during low AC line voltage results in the charger drawing higher input current, thereby affecting efficiency of the charger and also resulting in higher electricity consumption cost for the consumer.

A known art describes a method of charging a battery, wherein said method involves determining voltage on an AC power line by a battery charger. Said method determines whether the AC line voltage falls within a predetermined range of voltages in order to accordingly vary output current to the battery. Thus, the output current is allowed to vary based on AC line voltage until actual state of charge of battery reaches target state of charge. Thus, the charging of the battery is performed by continuous monitoring of the AC line voltage, and the same is continued till the target state of charge of the battery is reached. Since the charging is performed by continuously monitoring AC line voltage, the possibility of the battery getting charged quickly remains remote. As a result, it may not be possible to charge the battery to its full capacity quickly while continuously monitoring AC line voltage.

There is therefore a need for a charger device which is capable of overcoming the above and other shortcomings of conventional charger devices, while high working efficiency of the charger device is maintained.

BRIEF DESCRIPTION OF DRAWINGS

The detailed description of the present subject matter is described with reference to the accompanying figures. Same numbers are used throughout the drawings to reference like features and components.

DETAILED DESCRIPTION OF THE INVENTION

Figure 1:
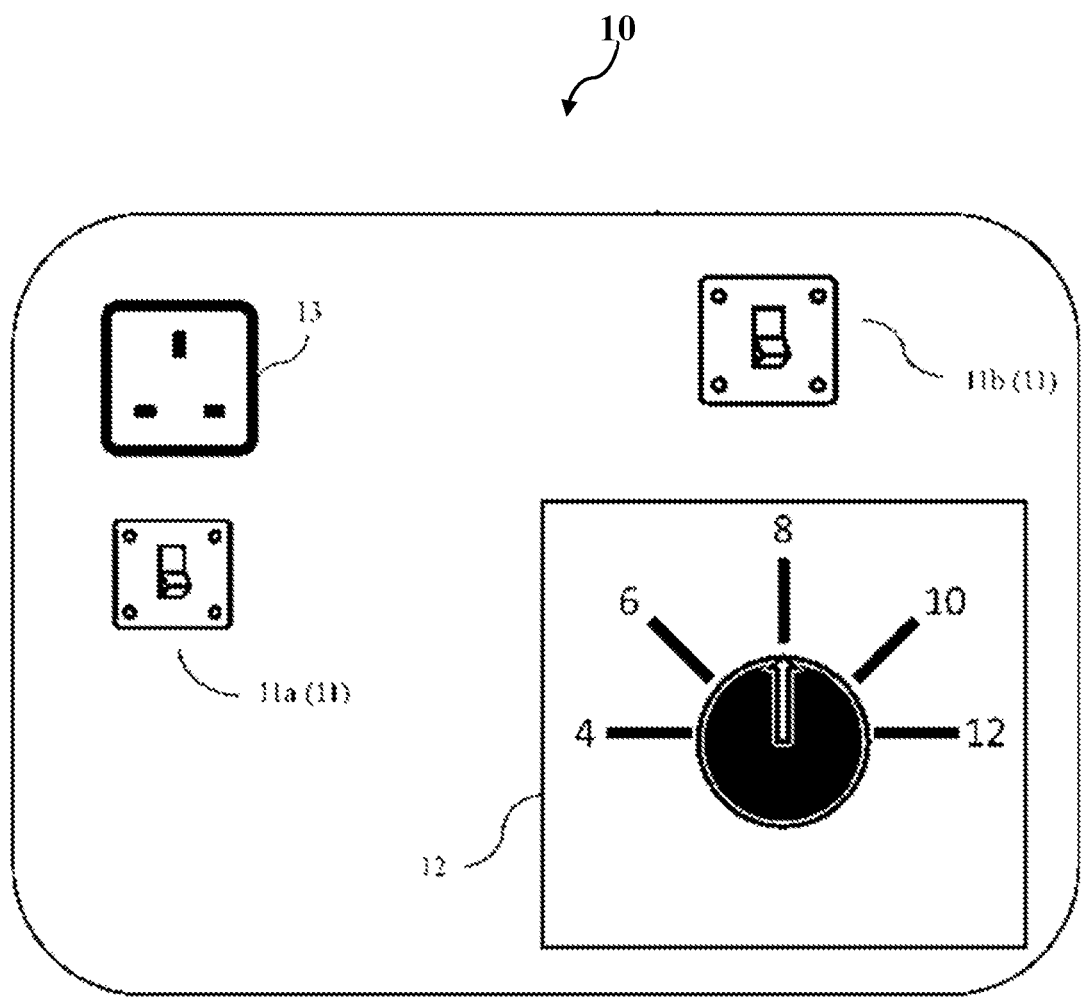
FIG. 1 illustrates a charger device for a battery in accordance with an embodiment of the present invention.

The present invention has been made in view of the above circumstances.

It is an object of the present invention to provide a charger device for charging a battery of vehicle which is configured to operate in two different user selectable charging modes including a power mode and an economy mode.

It is another object of the present invention to provide a charger device configured to perform battery charging in one of said two different user selectable charging modes by identifying AC line input voltage variations.

It is yet another object of the present invention to provide a charger device configured to perform battery charging in said economy mode by identifying AC line input voltage variations.

It is one more object of the present invention to provide a charger device whose construction permits a user to select time for which charging may be carried out in the economy mode.

It is another object of the present invention to provide a charger device configured to automatically regulate charging in economy mode by transitioning between two types of charging including economy charging and power charging so as to ensure complete charging of the battery within a user selected time interval.

It is still another object of the present invention to provide a charger device capable of performing economy charging in the economy mode based on identified AC line input voltage variations and based on user selected time duration.

It is one more object of the present invention to provide a charger device capable of performing power charging in the economy mode, by charging the battery with maximum charging current independent of AC line input voltage variations.

It is yet another object of the present invention to provide a charger device configured to supply variable output charging current corresponding to different input voltage as identified by said charger device.

It is still another object of the present invention to provide a charger device which is easy and convenient to use.

It is one more object of the present invention to provide a method for charging the battery of a vehicle efficiently.

With the above and other objects in view, the present invention provides a charger device for charging one or more batteries of a vehicle including two-wheeled hybrid and two-wheeled electric vehicle. As per an aspect of the present invention, the charger device is configured to perform charging in two different user selectable charging modes including an economy mode and a power mode. Particularly, a mode switch is made available in the charger device for selection of either the economy mode or the power mode for charging said batteries. More particularly, while an ON condition of the mode switch results in selection of the economy mode for battery charging, an OFF condition of the mode switch results in selection of the power mode for battery charging. Thus, the user/rider may select either the economy mode or the power mode for charging by switching ON or switching OFF the mode switch respectively. Particularly, while charging in the economy mode involves efficient charging within a user selected time duration, charging in the power mode involves fast charging. As per one aspect of the present invention, the charging of said batteries in either the economy mode or the power mode continues until a battery threshold voltage is reached, following which constant voltage charging is performed in order to complete battery charging to 100% SOC (State of Charge of battery).

As per another aspect of the present invention, the charger device is provided with a user adjustable time selection knob for allowing the user/rider to select a time duration for which he/she desires charging of said batteries to be performed in the economy mode. Thus, the user adjustable time selection knob is made available for adjusting the time duration for which the user/rider desires battery charging in the economy mode. However, said knob cannot be adjusted to select the time duration for which battery charging is to be performed in the power mode.

As per one more aspect of the present invention, the charger device is configured to perform two types of charging including economy charging and power charging in said economy mode based on the time duration as selected by the rider and based on the AC line input voltage. For example, said charger device is configured to automatically regulate charging in economy mode by transitioning between economy charging and power charging so as to ensure complete charging of said batteries within the user selected time duration. Typically, said charger device is configured to transition from economy charging to power charging when a difference between the time duration as selected by the user and an elapsed charge time is less than a combined time required for power charging and constant voltage charging. Thus, it is ensured that while charging of said batteries to at least some portion of its capacity is done efficiently by supplying an output/charging current corresponding to the input AC line voltage, maximum charging current for charging the battery to its remaining capacity is supplied by performing power charging independent of the AC line input voltage, in order to ensure that charging of said batteries to 100% capacity is completed within the user selected time duration. Therefore, as per the present invention it is possible to charge the battery to its full capacity quickly while also monitoring AC line input voltage in the economy mode, thereby enabling less wastage of electricity. Thus, it is ensured that cost of electricity for the customer is also reduced.

Therefore, the present subject matter described herein relates to a charger device for charging one or more batteries used for powering a vehicle including a hybrid vehicle and an electric vehicle. Particularly, said charger device enables efficient charging of said one or more batteries while taking into consideration AC line input voltage available for charging. Said charger device also enables time bound quick battery charging while monitoring AC line input voltage.

Exemplary embodiments detailing features of the charger device, in accordance with the present invention will be described hereunder. The embodiments described herein apply to a vehicle powered by two or more power sources including an internal combustion engine, traction motor and one or more batteries. However, the present invention is not restricted in its application and is also applicable to vehicles employing only the traction motor and the battery, say for example an electric vehicle.

FIG. 1 illustrates a charger device (10) in accordance with an embodiment of the present invention. As per an aspect of the present invention and as may be seen in FIG. 1 said charger device (10) includes at least two switches (11), a user selectable time knob (12) and an AC input plug (13). As per an embodiment said at least two switches (11) includes a power (11a) and a mode selection switch (11b). While said power switch (11a) is used for switching ON or switching OFF the charger device (10), said mode selection switch (11b) is used for selecting different modes of charging. For example, as per an aspect of the present invention two modes of charging including a power mode and an economy mode are made available in the charger device for the user/rider to select. While charging in power mode allows fast charging irrespective of AC input voltage, charging in economy mode allows optimal charging taking into consideration the AC input voltage. As per one aspect, said charger device (10) is configured to perform battery charging in said economy mode when said mode selection switch (11b) is selected/switched ON. Thus, based on the user's preference, the mode of battery charging can be selected. Further, based on his/her preference, the user may also select the time within which charging is to be performed in the economy mode, by adjusting the user selectable time knob (12). Thus, based on the time selected by the user, charging of said one or batteries to 100% SOC is completed by said charger device (10). As per an aspect of the present invention, said user selectable time knob (12) can be adjusted only when said mode selection switch (11b) is switched ON. In other words, said user selectable time knob (12) is adjustable only when the user/rider chooses the economy mode for battery charging by switching ON the mode selection switch (11b). Thus, the user/rider may select the economy mode for charging if he/she considers that sufficient time is available for charging. In a condition where the available time for charging is less, power mode may be chosen by keeping the mode selection switch (11b) in an OFF condition. Further, irrespective of the mode of charging whether in power mode or in economy mode, the charger device (10) typically initially performs constant current charging till battery voltage reaches a predetermined battery voltage threshold value, followed by performing constant voltage charging till battery current/battery charging current reaches/attains a predetermined battery current threshold value, after which the charger device stops charging. Say for example, for a 10AH battery having 13 cells in series, with each cell having maximum cell voltage of 4.1V, the charger device performs constant current charging till battery voltage reaches a predetermined battery voltage threshold value of 53.3V, followed by performing constant voltage charging till battery current/battery charging current reaches/attains a predetermined battery current threshold value of 0.3 A, below which the charger device stops charging.

Figure 2:
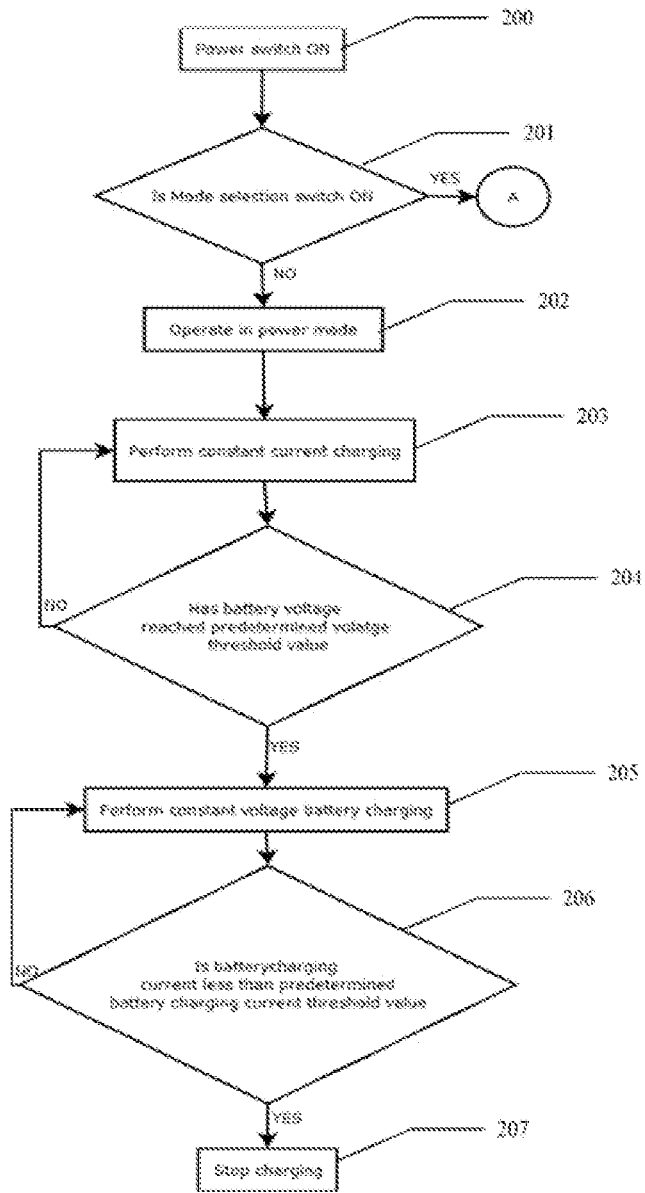
FIG. 2 illustrates a flow chart depicting steps of a method of functioning of said charger device selected to be operated in a power mode.

FIG. 2 illustrates a flow chart depicting steps of a method of functioning of said charger device for charging said one or more batteries in power mode. As per an aspect of the present invention said charger device (10) includes a controller installed therein for controlling the operation of said device in said power mode and said economy mode. Particularly, FIG. 2 illustrates steps involved in operation of said charger device (10) in said power mode.

In a first step of its operation at block (200), the controller determines whether the power switch is ON/OFF. In a condition where said power switch (11a) is in ON state, the controller determines whether said mode selection switch 11b is in an ON state or an OFF state at block (201). In a condition where said mode selection switch is in OFF state, the controller causes said charger device to be operated in the power mode at block (202). Battery charging in the power mode involves constant current charging. Thus, the controller causes the charger device 10 to perform constant current charging at block (203). Further, the controller monitors battery voltage continuously and determines whether battery voltage has reached a predetermined voltage threshold value stored therein, said predetermined voltage threshold value corresponding to a voltage threshold for constant current battery charging at block (204). In a condition where battery voltage has reached said predetermined voltage threshold value, the controller causes the charger device to perform constant voltage charging at block (205). During the constant voltage charging said controller monitors a battery charging current/battery current. In a condition where battery charging current is less than a predetermined battery charging current threshold value the controller causes the charger device (10) to stop charging at block (206). In a condition where the battery charging current is not less than said predetermined battery charging current threshold value, the controller causes the charger device to continue constant voltage charging. Thus, the charger device (10) completes battery charging to 100% SOC by performing constant voltage charging following constant current charging.

Figure 3:
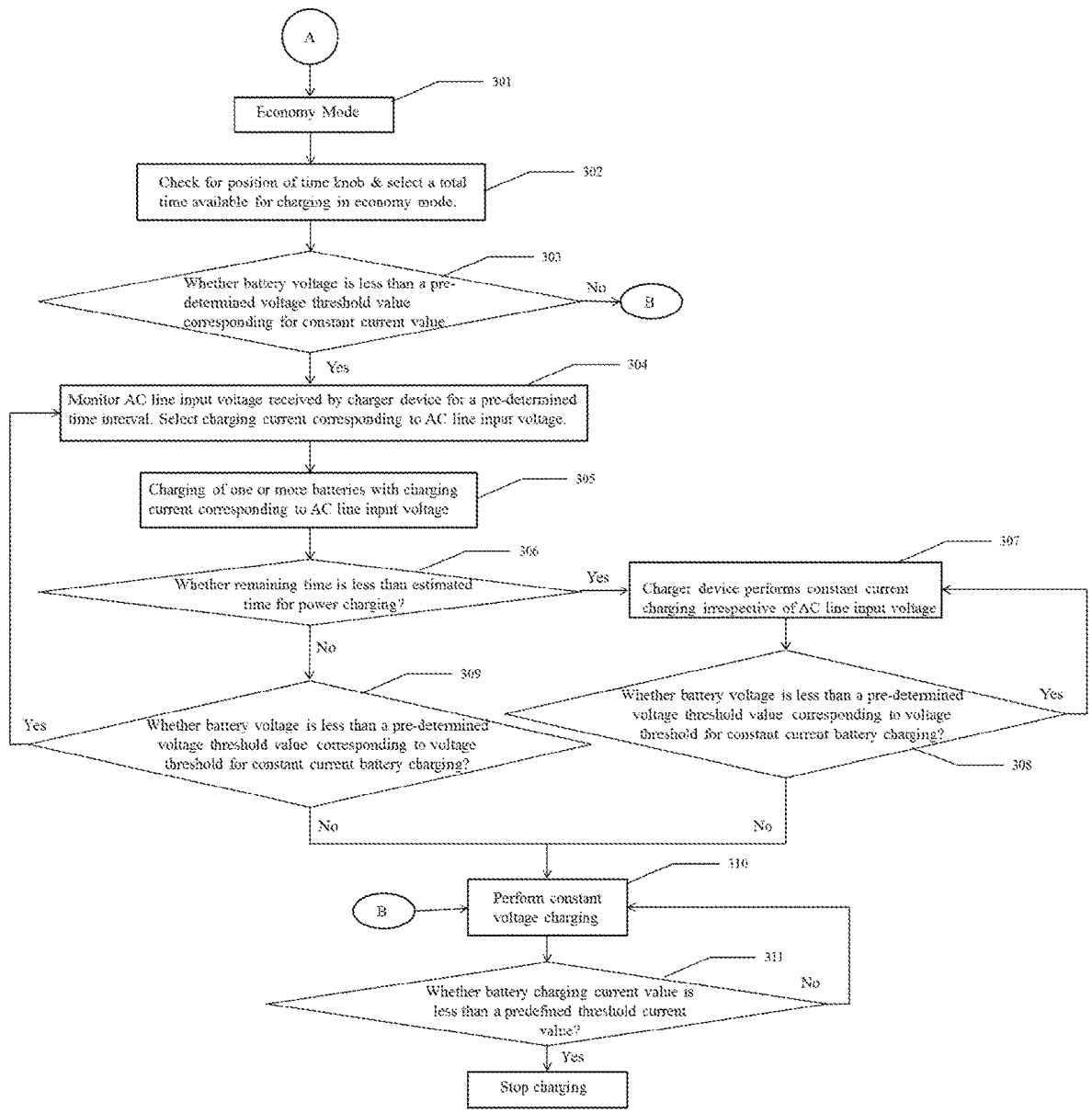
FIG. 3 illustrates a flow chart depicting steps of a method of functioning of said charger device selected to be operated in an economy mode.

Operation of the charger device in said economy mode is illustrated in FIG. 3. FIG. 3 illustrates a flow chart depicting steps of a method of functioning of said charger device for charging said one or more batteries in said economy mode. In a condition where said mode selection switch is in an ON state as selected by the user/rider and as detected by the controller, the controller causes the charger device (10) to operate in said economy mode as depicted in block (301). Further, the controller checks for the position of the user selectable time knob (12) on the charger device (10). For example, as may be seen in FIG. 1, said knob (12) is configured to be positioned at five different positions corresponding to different charging time intervals, say for example 4 hrs, 6 hrs, 8 hrs, 10 hrs and 12 hrs. Based on the position of the user selectable time knob (12), the controller determines a time for which the charger device should carry out charging in the economy mode, followed by constant voltage charging. Thus, at block (302), the controller checks for position of said knob (12) and selects a total time available for charging in economy mode by setting aside a minimum of 30 minutes for constant voltage charging from the user selected time using said knob (12). Further, the controller checks whether battery voltage is less than or greater than said predetermined voltage threshold value corresponding to voltage threshold for constant current battery charging at block (303). In a condition where the battery voltage is less than said predetermined voltage threshold value, the controller begins monitoring AC line input voltage that the charger device receives, for a predetermined time interval and selects a charging current corresponding to said AC line input voltage at block (304). Thus, the controller causes the charger device to function by charging said one or more batteries with charging current corresponding to said AC line input voltage at block (305). In other words, the charger device performs economy charging in said economy mode. While the charger device is performing economy charging, the controller continuously monitors a remaining time available for completing charging in said economy mode based on the user selected time for charging in economy mode. Further, the controller memory being fed with information regarding estimated time required for power charging is configured to effectuate power charging for a predefined duration.

At block (306), the controller checks whether said remaining time is less than said estimated time required for power charging. In a condition where said remaining time for economy charging is less than said estimated time required for power charging, then said charger device performs constant current charging with rated current irrespective of AC line input voltage at block (307). Further, while performing constant current charging, the charger device checks if the battery voltage is less than said predetermined voltage threshold value corresponding to voltage threshold for constant current battery charging at block (308). If the battery voltage is less than the predetermined voltage threshold value, then the charger device continues constant current charging, however if the battery voltage is greater than said predetermined voltage threshold value, then the charger device the controller causes the charger device to perform constant voltage charging at block (310). Further, the charger device continues constant voltage charging until a battery charging current value is less than a predefined threshold current value stored in the controller.

In a condition where said remaining time for economy charging is not less than said estimated time required for power charging, the controller checks if battery voltage at that instant is less than said predetermined voltage threshold value at block (309). If the battery voltage is less than said predetermined voltage threshold value corresponding to voltage threshold for constant current battery charging, the controller causes the charger device to continue constant current charging by taking into account the AC line input voltage. However, if the battery voltage is greater than said predetermined voltage threshold value, the controller causes the charger device to perform constant voltage charging at block (310) in order to complete battery charging to 100% SOC and continue the constant voltage charging until battery charging current value is less than said predefined threshold current value stored in the controller.

Thus, as per an aspect of the present invention, the charger device is configured to perform charging irrespective of the AC line input voltage even in the economy mode. This is to ensure that charging of said one or more batteries is completed within the total time selected for economy charging by the user.

Figure 4A:
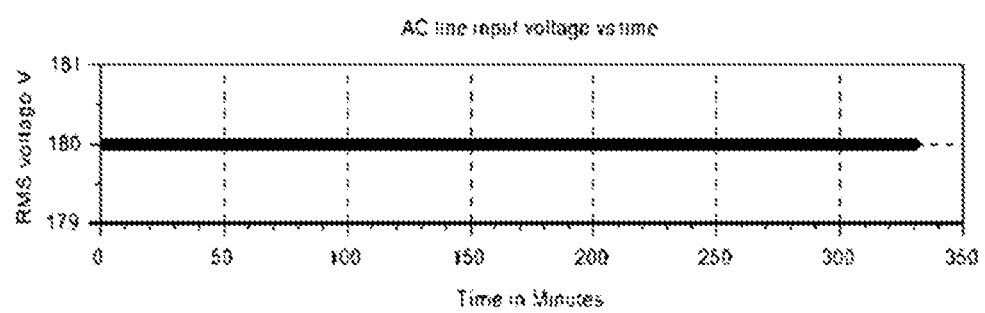
FIG. 4a illustrates a plot of RMS voltage vs. time available for charging in economy mode.
Figure 4B:
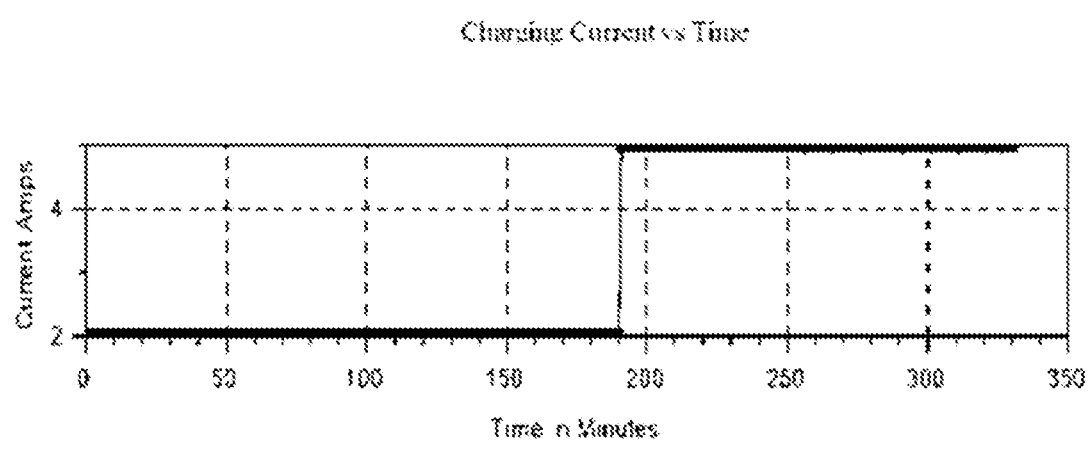
FIG. 4b illustrates a plot of charging current vs. time available for charging in economy mode.
Figure 4C:
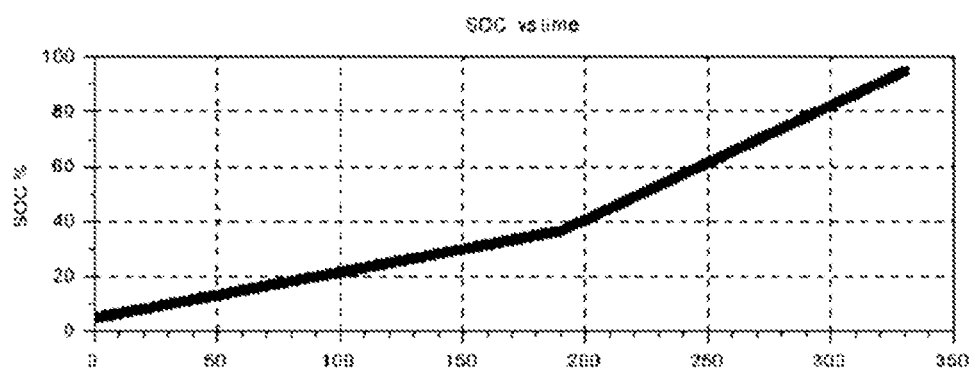
FIG. 4c illustrates a plot of % SOC vs. time available for charging in economy mode.

An example for illustrating functioning of the charger device in the economy mode is explained with the aid of FIGS. 4*a*-4*c*. For example, if the user has switched ON the mode switch (11*b*) and has selected a time interval of 6 h for charging in the economy mode using said knob (12), then the controller notes 6 h or 360 min as the total charging time. However, as per an embodiment of the present invention, the controller recalculates the available time for economy mode charging by subtracting time taken for constant voltage charging as 30 min. Hence the total time available for charging in economy mode is set as 330 min as seen in FIG. 4*a*. In a condition where the battery SOC is low at the outset, the controller causes the charger device to perform constant current charging. Particularly, the charger device performs constant current charging based on AC line input voltage. In other words, the charger device performs constant current charging with charging current having a magnitude corresponding to said AC line input voltage. As may be seen in FIG. 4*b* and as per the present example, the AC line input voltage as detected by the controller is 180V (see FIG. 4*a*) and therefore the magnitude of constant current selected is 2 Amps. The controller would continue to monitor the AC line input voltage and keep changing magnitude of constant current until remaining time available for economy charging is greater than estimated time required for power charging or for charging with constant current having highest magnitude. For example, at a time t=190 min, the remaining time available for charging in economy mode would be 330−190=140 min, which is less than estimated time of 140.4 min required for power charging/charging with highest magnitude constant current; there would be a change of current from 2 Amps to 5 Amps as seen in FIG. 4b. In other words, the estimated time is nothing but the time required for charging battery having a certain percentage of battery SOC with highest magnitude current. Further, the charger device would continue to charge said one or more batteries with constant current of highest magnitude/highest rated current irrespective of AC input voltage until battery voltage reaches said predetermined voltage threshold value. The charger device continues charging with constant current of highest magnitude until battery SOC reaches 95% (shown in FIG. 4c), subsequent to which constant voltage charging is performed from 330 min to 360 min for attaining 100% battery SOC.

Thus, as is apparent from the above teaching, by switching over to constant current charging with highest magnitude when remaining time available for charging in economy mode is less than estimated time required for power charging, it is ensured that charging is completed within the user selected time in the economy mode. Thus, a balance is struck to ensure economy charging by monitoring AC line input voltage along with ensuring quick charging within the user selected time interval.

We claim:

1. A charger device for charging one or more batteries of a vehicle, wherein
    the charger device is operable in different user selectable modes including a power mode and an economy mode,
    in the economy mode, during a time interval that is determined based on a user selected time, the charger device:
        monitors an alternating current (AC) line input voltage, and
        charges the one or more batteries with a first charging current that varies according to a variation in the monitored AC line input voltage,
    the charger device is operable in one of the different user selectable modes until a battery threshold voltage is reached, and
    when the battery threshold is reached, the charger device performs constant voltage charging of the one or more batteries until a second charging current for constant voltage charging attained is less than a set threshold current value.

2. The charger device as claimed in claim 1, wherein
    the charger device comprises at least two switches and a user adjustable time selection knob,
    the at least two switches include a power switch and a mode selection switch, and
    an ON condition of the mode selection switch allows charging of the one or more batteries in the economy mode.

3. The charger device as claimed in claim 2, wherein the charger device performs either economy charging or power charging in the economy mode based on the AC line input voltage and the user selected time interval selected using the user adjustable time selection knob, until the battery threshold voltage is reached, followed by the constant voltage charging.

4. The charger device as claimed in claim 3, wherein the economy charging in the economy mode includes charging the one or more batteries with the first charging current corresponding to the AC line input voltage.

5. The charger device as claimed in claim 3, wherein the power charging in the economy mode includes charging the one or more batteries with a maximum charging current independent of the AC line input voltage.

6. The charger device as claimed in claim 3, wherein the charger device:
    continue performing the economy charging in the economy mode until a difference between the user selected time interval and an elapsed charge time is greater than a combined time required for the power charging and the constant voltage charging, and
    subsequently switch to the power charging in the economy mode.

7. The charger device as claimed in claim 6, wherein the charger device supplies a maximum charging current for charging the one or more batteries to remaining capacity of the one or more batteries by the power charging independent of the AC line input voltage to ensure that charging of the one or more batteries to 100% capacity is completed within the user selected time interval.

8. The charger device as claimed in claim 3, wherein the charger device supplies a maximum charging current for charging the one or more batteries to remaining capacity of the one or more batteries by the power charging independent of the AC line input voltage to ensure that charging of the one or more batteries to 100% capacity is completed within the user selected time interval selected using the user adjustable time selection knob.

9. The charger device as claimed in claim 1, wherein the charger device stops charging of the one or more batteries when the charging current is less than the set threshold current value.

10. The charger device as claimed in claim 1, wherein in the power mode, the charger device:
    charges the one or more batteries with a maximum charging current independent of the AC input voltage until the one or more batteries attains the threshold voltage,
    after the one or more batteries attains the threshold voltage, performs the constant voltage charging until the charging current attained is less than the set threshold current value.

11. A method for charging one or more batteries of a vehicle using a charger device, wherein
    the charger device is operable in different user selectable modes, which a power mode and an economy mode, until a battery threshold voltage is reached, following which constant voltage charging is performed until a charging current is less than a set threshold current value,
    the charger device includes at least two switches including a power switch and a mode selection switch and a user adjustable time selection knob, and
    an ON condition of the mode selection switch allows battery charging in the economy mode, the method comprising:
    determining, by the charger device, one of the ON condition and an OFF condition of the mode selection switch;
    determining, by the charger device, a user selected time interval selected using the user adjustable time selection knob;
    performing, by the charger device, charging of the one or more batteries in the economy mode when the mode selection switch is in the ON condition;
    in the economy mode, until a difference between the user selected time interval and an elapsed charge time is greater than a combined time required for power charging and the constant voltage charging,
monitoring, by the charger device, an alternating current (AC) line input voltage, and
performing economy charging of the one or more batteries with a charging current that varies according to a variation in the monitored AC line input voltage;
charging, by the charger device, the one or more batteries with a maximum charging current independent of the AC line input voltage when the difference is less than the combined time;
charging, by the charger device, the one or more batteries with the constant voltage charging when voltage of the one or more batteries is greater than or equal to the battery threshold voltage; and
stopping the constant voltage charging when the charging current is less than the set threshold current value.

12. The method as claimed in claim 11, wherein the power charging includes charging the one or more batteries with the maximum charging current when the mode selection switch is in the OFF condition.

13. The method as claimed in claim 11, wherein charging one or more batteries in the power mode includes charging with the maximum charging current until the one or more batteries attain the battery threshold voltage, followed by the constant voltage charging until the charging current attained is less than the set threshold current value.

* * * * *